United States Patent
Zeng et al.

(10) Patent No.: US 11,624,501 B2
(45) Date of Patent: Apr. 11, 2023

(54) HIGH VOLTAGE CONTROL BOX WITH LIGHT SENSING AND TIMING FUNCTIONS AND CONTROL METHOD THEREOF

(71) Applicant: Zhejiang Twinsel Electronic Technology Co., Ltd., Zhejiang (CN)

(72) Inventors: Xueren Zeng, Zhejiang (CN); Zhenzhong Kong, Zhejiang (CN); Chunlai Ge, Zhejiang (CN); Shengfeng Ge, Zhejiang (CN)

(*) Notice: Subject to any disclaimer, the term of this patent is extended or adjusted under 35 U.S.C. 154(b) by 0 days.

(21) Appl. No.: 17/512,669

(22) Filed: Oct. 28, 2021

(65) Prior Publication Data
US 2023/0025957 A1    Jan. 26, 2023

(30) Foreign Application Priority Data

Jul. 20, 2021    (CN) .......................... 202110817428.5

(51) Int. Cl.
| | |
|---|---|
| F21V 23/00 | (2015.01) |
| F21V 31/00 | (2006.01) |
| F21S 4/10 | (2016.01) |
| F21V 23/04 | (2006.01) |

(52) U.S. Cl.
CPC .............. *F21V 23/007* (2013.01); *F21S 4/10* (2016.01); *F21V 23/04* (2013.01); *F21V 31/005* (2013.01)

(58) Field of Classification Search
CPC ...... F21V 23/007; F21V 23/04; F21V 31/005; F21S 4/10
See application file for complete search history.

(56) References Cited

U.S. PATENT DOCUMENTS

| | | | | |
|---|---|---|---|---|
| 5,831,515 | A * | 11/1998 | Stewart | G08B 3/10 340/471 |
| 8,450,950 | B2 * | 5/2013 | McRae | H05B 45/20 315/318 |
| 8,760,293 | B2 * | 6/2014 | Steiner | G01J 1/0219 340/567 |
| 2010/0265724 | A1 * | 10/2010 | Yang | F21S 8/086 362/344 |
| 2015/0084515 | A1 * | 3/2015 | Altamura | H05B 45/20 315/131 |
| 2015/0373796 | A1 * | 12/2015 | Bahrehmand | H05B 45/325 315/129 |

(Continued)

*Primary Examiner* — Tsion Tumebo
(74) *Attorney, Agent, or Firm* — Prakash Nama; Global IP Services, PLLC

(57) ABSTRACT

A high voltage control box with light sensing and timing functions is formed by matching an upper cover and a bottom plate; the upper cover is provided with a rocker switch, a light guide column and a knob; a button switch and a knob switch are arranged in the high voltage control box; the button switch is matched with the rocker switch; the knob switch is matched with the knob; a circuit board is arranged in the high voltage control box; and the button switch and the knob switch are arranged on the circuit board. The high voltage control box with light sensing and timing functions in the present invention controls the switch of the bulbs and the switch time through light sensing and timing of the plurality of lamp strings, enhances intelligence of the lamp strings without manual control, and enhances the market competitiveness of products while saving power.

1 Claim, 2 Drawing Sheets

(56) References Cited

U.S. PATENT DOCUMENTS

| | | | | |
|---|---|---|---|---|
| 2016/0091196 A1* | 3/2016 | Chien | ................ | F21V 33/0004 |
| | | | | 362/253 |
| 2016/0313636 A1* | 10/2016 | Chien | .................... | F21V 21/08 |
| 2019/0032898 A1* | 1/2019 | Chen | ....................... | F21V 5/007 |
| 2019/0253670 A1* | 8/2019 | Chien | ................. | H04N 5/2256 |
| 2019/0320515 A1* | 10/2019 | Sadwick | ............... | H05B 45/00 |

* cited by examiner

HIGH VOLTAGE CONTROL BOX WITH LIGHT SENSING AND TIMING FUNCTIONS AND CONTROL METHOD THEREOF

BACKGROUND OF THE INVENTION

The present invention relates to a high voltage control box with light sensing and timing functions and a control method thereof.

LED lighting lamps are energy-efficient, and thus have gradually replaced traditional incandescent lamps and fluorescent lamps and gradually evolved into the traditional lamps. With the continuous decrease of the market price, more and more consumers have begun to accept and use the LED lamps for illumination. The existing LED lighting lamps can be realized in the field of lamp string control, and cannot realize light sensing and timing, and are very low in performance price ratio.

BRIEF SUMMARY OF THE INVENTION

The present invention provides a high voltage control box with high intelligence and light sensing and timing functions and a control method thereof.

Technical solutions adopted to solve the above technical problems by the present invention are as follows:

The high voltage control box with light sensing and timing functions is formed by matching an upper cover and a bottom plate; the upper cover is provided with a rocker switch, a light guide column and a knob; a button switch and a knob switch are arranged in the high voltage control box; the button switch is matched with the rocker switch; the knob switch is matched with the knob; a circuit board is arranged in the high voltage control box; and the button switch and the knob switch are arranged on the circuit board.

A tail plug lamp string is arranged on the side part of the high voltage control box, and a plurality of bulbs are connected to the tail plug lamp string in parallel. The other side of the high voltage control box relative to the tail plug lamp string is provided with a socket; the socket and the tail plug lamp string are arranged on both sides of the circuit board; the circuit board comprises a first part, a second part, a third part and a fourth part; the first part is connected with the second part in parallel; the first part and the second part which are connected in parallel are connected in series with the third part and the fourth part; the first part and the second part are connected with J1; the second part is connected with J2; J1 is a power input end; and J2 is an output end controlled by a controller.

Preferably, a sealing ring is arranged between the upper cover and the bottom plate; the upper cover and the bottom plate are locked through a triangular head anti-theft screw; and a screw sealing ring is sleeved on the triangular head anti-theft screw.

Preferably, a first knob sealing ring and a second knob sealing ring are arranged between the knob and the upper cover.

Preferably, the bottom plate is provided with a tension disc.

Preferably, a plastic waterproof connector is arranged at the connection between the tail plug lamp string and the high voltage control box.

Preferably, the first part realizes the simultaneous connection of a plurality of lamp strings with the controller, and the first part is composed of a two-level switch to realize selection of a control circuit.

Preferably, the second part is a resistance capacitance step-down part which reduces high voltage into low voltage.

Preferably, the third part is a rectification filtering part to achieve a stable power supply environment.

Preferably, the fourth part is a light sensing and timing control part; a MCU is mainly used to control the on and off of a relay to realize light sensing and timing functions; and the knob switch can realize selection of the functions.

A control method of the high voltage control box with light sensing and timing functions comprises the following steps:

(1) when pulling the rocker switch to ON2 level, supplying power for the fourth part by the second part and the third part to allow the fourth part to work; using the MCU for controlling ½ pin of the relay to control closing and opening of 5/2 pin to realize opening and closing of the circuit; at this moment, allowing L of J1 end to pass through 5/2 of the relay from OUT2 by the first part to reach L1 of J2; and realizing, by a band switch, the selection of a timing level and a light sensing level of the fourth part;

(2) when pulling the rocker switch to ON1 level, making circuit selection not controlled by the fourth part, directly from L to L1, which completely pulls the controller started from a second string to the level when a plurality of strings are connected; and at this moment, pulling a first string to the ON2 level.

Compared with the prior art, the high voltage control box with light sensing and timing functions in the present invention controls the switch of the bulbs and the switch time through light sensing and timing of the plurality of lamp strings, enhances intelligence of the lamp strings without manual control, and enhances the market competitiveness of products while saving power.

DETAILED DESCRIPTION OF THE INVENTION

The present invention is further described below in detail in combination with the drawings and embodiments.

Figure 1:
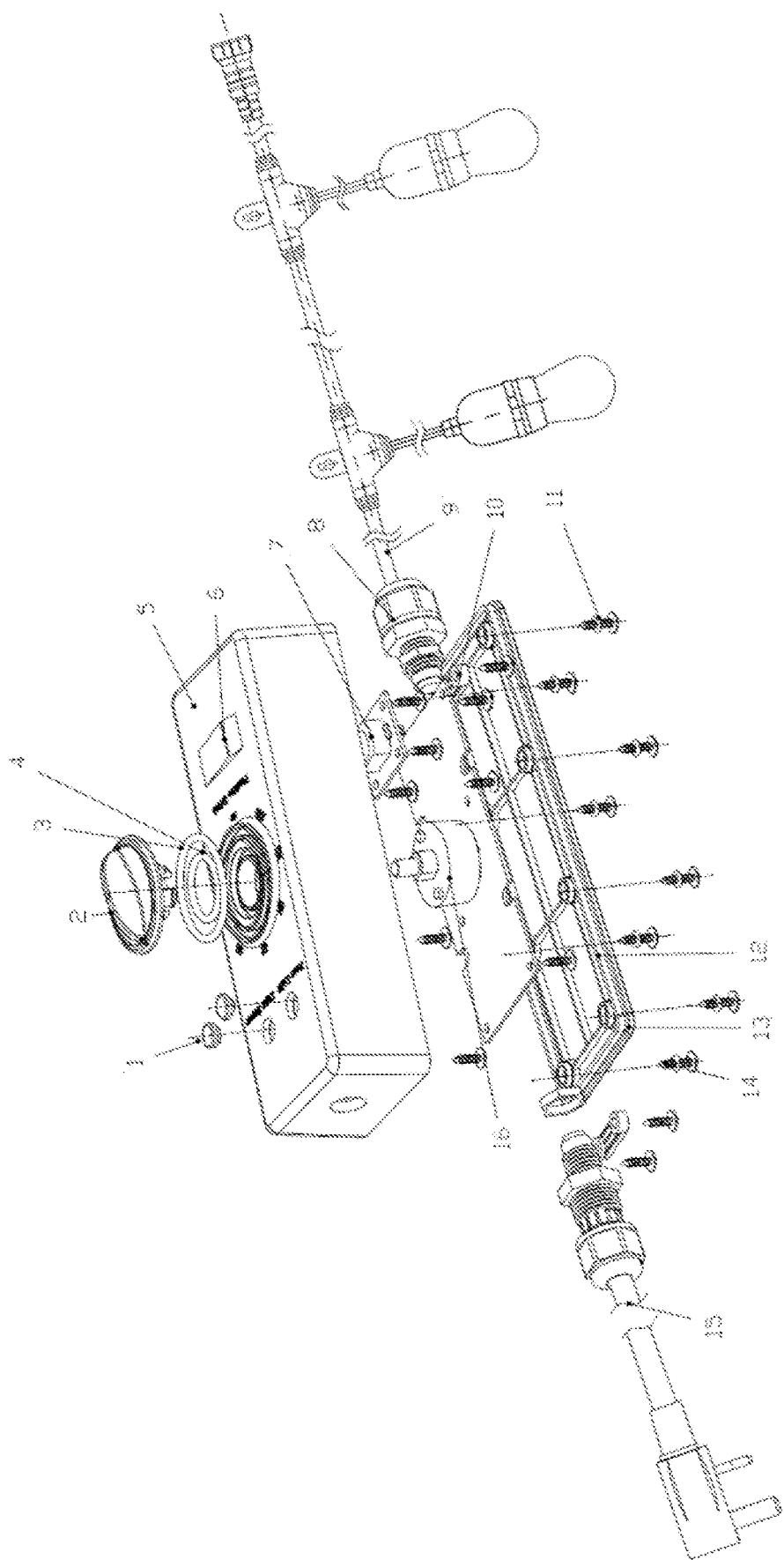
FIG. 1 is a stereographic schematic diagram of a high voltage control box with light sensing and timing functions and a control method thereof in the present invention.
Figure 2:
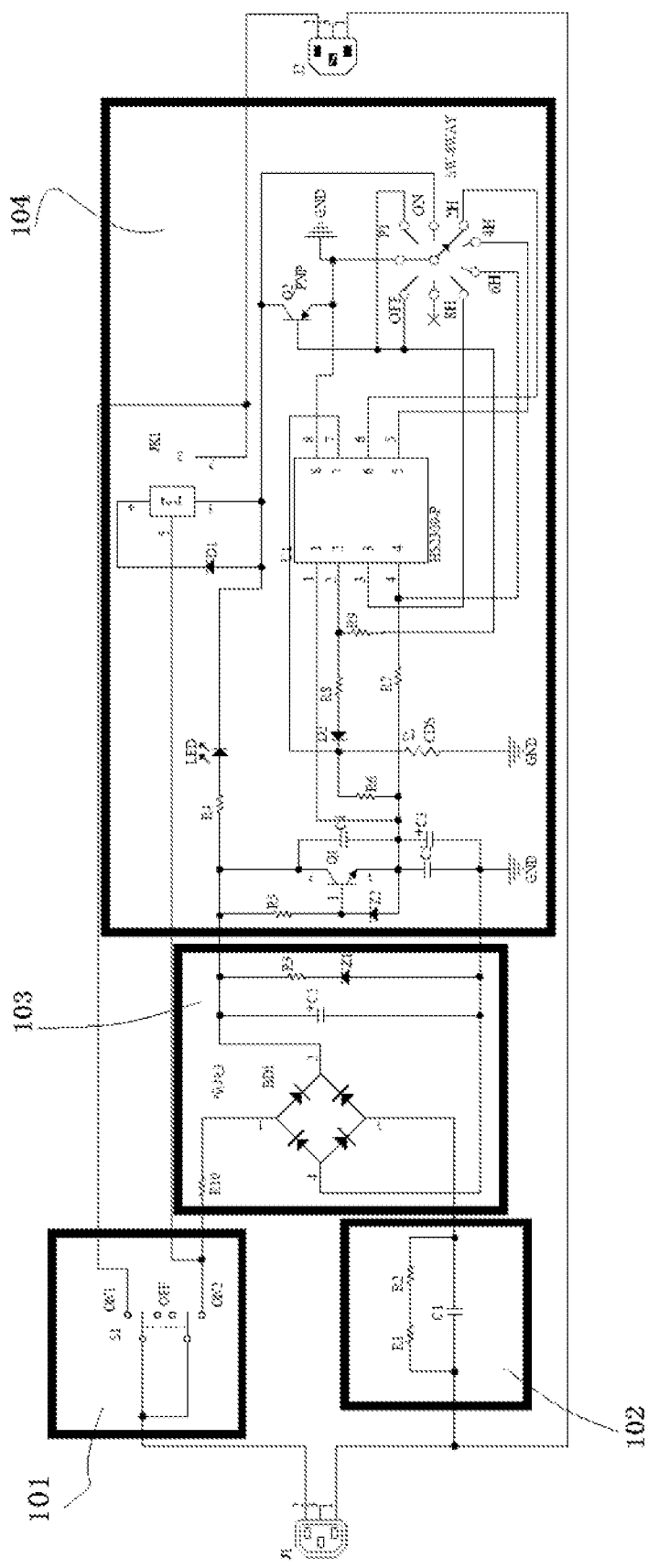
FIG. 2 is a circuit diagram of a high voltage control box with light sensing and timing functions and a control method thereof in the present invention.

As shown in FIG. 1 to FIG. 2, a high voltage control box is formed by matching an upper cover 5 and a bottom plate 13; a sealing ring 12 is arranged between the upper cover 5 and the bottom plate 13; the upper cover 5 and the bottom plate 13 are locked through a triangular head anti-theft screw 14; a screw sealing ring 11 is sleeved on the triangular head anti-theft screw 14; the upper cover 5 is provided with a rocker switch 6, a light guide column 1 and a knob 2; a first knob sealing ring 3 and a second knob sealing ring 4 are arranged between the knob 2 and the upper cover 5; a button switch 7 and a knob switch 16 are arranged in the high voltage control box; the button switch 7 is matched with the rocker switch 6; the knob switch 16 is matched with the knob 2; and the bottom plate 13 is provided with a tension disc 10. A circuit board is arranged in the high voltage control box; and the button switch 7 and the knob switch 16 are arranged on the circuit board.

A tail plug lamp string 9 is arranged on the side part of the high voltage control box; a plastic waterproof connector 8 is arranged at the connection between the tail plug lamp string 9 and the high voltage control box; and a plurality of bulbs are connected to the tail plug lamp string 9 in parallel. The other side of the high voltage control box relative to the tail plug lamp string 9 is provided with a socket 15. The socket 15 and the tail plug lamp string 9 are arranged on both sides of the circuit board. The circuit board comprises a first part 101, a second part 102, a third part 103 and a fourth part 104; the first part 101 is connected with the second part 102 in parallel; and the first part 101 and the second part 102 which are connected in parallel are connected in series with the third part 103 and the fourth part 104. The first part 101 and the second part 102 are connected with J1; and the second part 104 is connected with J2.

J1 is a power input end; and J2 is an output end controlled by a controller.

The first part 101 realizes the simultaneous connection of a plurality of lamp strings with the controller, and the first part 101 is composed of a two-level switch (on-off-on) to realize selection of a control circuit, to determine whether the controlled lamp strings need control of light sensing and timing, or need control of the above controller without control of the circuit, thereby laying a solid foundation for multi-string connection and control of the first string only.

The second part 102 is a resistance capacitance step-down part which reduces high voltage into low voltage to supply power for the control part below.

The third part 103 is a rectification filtering part to achieve a stable power supply environment.

The fourth part 104 is a light sensing and timing control part; a MCU is mainly used to control the on and off of a relay to realize light sensing and timing functions; and the knob switch 16 can realize selection of the functions, such as timing 2H/4H/6H/8H or light control function only.

When the rocker switch 6 is pulled to OFF level, then the circuit board is open. When the rocker switch 6 is pulled to ON2 level, then power is supplied for the fourth part 104 by the second part 102 and the third part 103 to allow the fourth part 104 to work; the MCU is used for controlling ½ pin of the relay to control closing and opening of 5/2 pin to realize opening and closing of the circuit (at this moment, L of J1 end passes through 5/2 of the relay from OUT2 by the first part 101 to reach L1 of J2); and a band switch realizes the selection of a timing level and a light sensing level of the fourth part 104. When the rocker switch 6 is pulled to ON1 level, circuit selection is not controlled by the fourth part 104, directly from L to L1, which completely pulls the controller started from a second string to the level when a plurality of strings are connected so that the first controller of all the controllers realizes light sensing and timing control; and at this moment, a first string is pulled to the ON2 level.

The high voltage control box with light sensing and timing functions in the present invention controls the switch of the bulbs and the switch time through light sensing and timing of the plurality of lamp strings, enhances intelligence of the lamp strings without manual control, and enhances the market competitiveness of products while saving power.

Finally, it should be noted that the above embodiments are only used for describing the technical solutions of the present invention rather than limitation. Although the present invention is described in detail by referring to the above embodiments, those ordinary skilled in the art should understand that the technical solution recorded in each of the above embodiments can be still amended, or some technical features therein can be replaced equivalently. However, these amendments or replacements do not enable the essence of the corresponding technical solutions to depart from the spirit and the scope of the technical solutions of various embodiments of the present invention.

What is claimed is:

1. A control method of a high voltage control box with light sensing and timing functions, wherein the high voltage control box is formed by matching an upper cover (5) and a bottom plate (13); the upper cover (5) is provided with a rocker switch (6), a light guide column (1) and a knob (2); a button switch (7) and a knob switch (16) are arranged in the high voltage control box; the button switch (7) is matched with the rocker switch (6); the knob switch (16) is matched with the knob (2); a circuit board is arranged in the high voltage control box; and the button switch (7) and the knob switch (16) are arranged on the circuit board;

a tail plug lamp string (9) is arranged on the side part of the high voltage control box, and a plurality of bulbs are connected to the tail plug lamp string (9) in parallel; the other side of the high voltage control box relative to the tail plug lamp string (9) is provided with a socket (15); the socket (15) and the tail plug lamp string (9) are arranged on both sides of the circuit board; the circuit board comprises a first part (101), a second part (102), a third part (103) and a fourth part (104); the first part (101) is connected with the second part (102) in parallel; the first part (101) and the second part (102) which are connected in parallel are connected in series with the third part (103) and the fourth part (104); the first part (101) and the second part (102) are connected with J1; the second part (104) is connected with J2; J1 is a power input end; and J2 is an output end controlled by a controller;

the control method of the high voltage control box with light sensing and timing functions comprises the following steps:

(1) when pulling the rocker switch (6) to ON2 level, supplying power for the fourth part (104) by the second part (102) and the third part (103) to allow the fourth part (104) to work; using a MCU for controlling ½ pin of a relay to control closing and opening of 5/2 pin to realize opening and closing of a circuit; at this moment, allowing L of J1 end to pass through 5/2 of the relay from OUT2 by the first part (101) to reach L1 of J2; and realizing, by a band switch, selection of a timing level and a light sensing level of the fourth part (104);

(2) when pulling the rocker switch (6) to ON1 level, making circuit selection not controlled by the fourth part (104), directly from L to L1, which completely pulls the controller started from a second string to the level when a plurality of strings are connected; and at this moment, pulling a first string to the ON2 level.

* * * * *